Dec. 15, 1970 W. A. HAGGERTY 3,547,798
ELECTROCHEMICAL MACHINING TOOL
Filed March 29, 1967
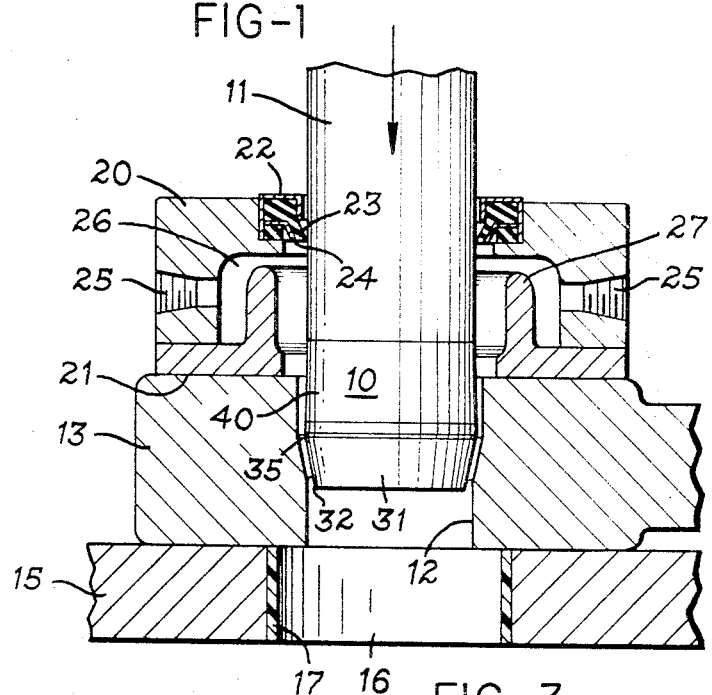
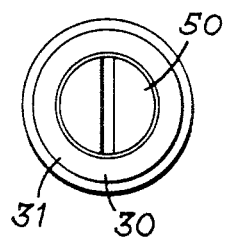
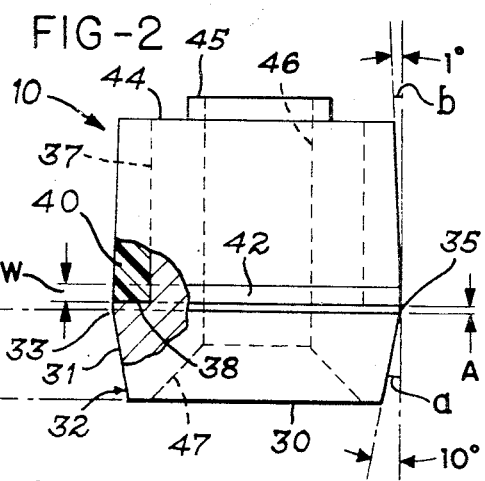
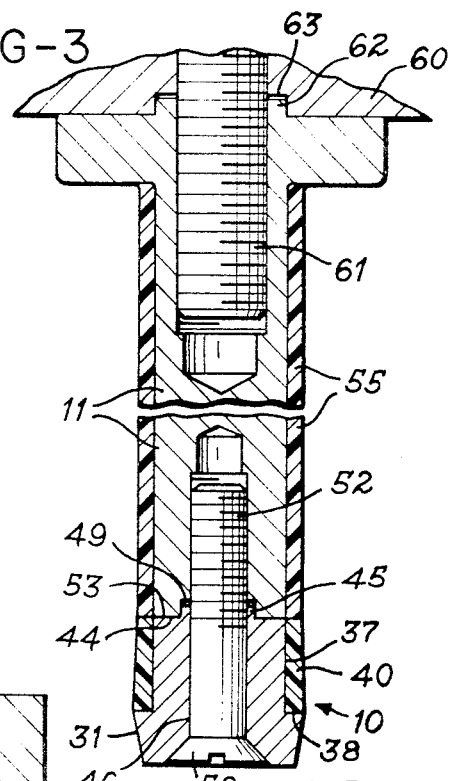
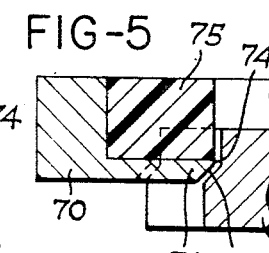
INVENTOR
WILLIAM A. HAGGERTY
BY
Marechal, Biebel, French & Bugg
ATTORNEYS

United States Patent Office 3,547,798
Patented Dec. 15, 1970

3,547,798
ELECTROCHEMICAL MACHINING TOOL
William A. Haggerty, Cincinnati, Ohio, assignor to Cincinnati Milacron Inc., Cincinnati, Ohio, a corporation of Ohio
Filed Mar. 29, 1967, Ser. No. 626,901
Int. Cl. B23p *1/04;* B01k *3/04*
U.S. Cl. 204—224               9 Claims

ABSTRACT OF THE DISCLOSURE

A tool for electrochemical machining and finishing a previously formed opening in an electrically conductive workpiece to a precise dimension includes a tapered first machining surface proportioned at its forward edge to be received partially into the opening and which increases its size substantially to the dimension of the finished opening thereby providing a relatively large effective machining surface for rapid penetration of the tool into the workpiece, and a second machining surface adjacent the first having a precisely controlled axial and circumferential dimensions to dimension and shape precisely the finished opening. The tool is also provided with insulation immediately adjacent the second machining surface to prevent further machining of the workpiece and at the same time to provide a continuous outer surface allowing for smooth flow of electrolyte between the work and the workpiece.

RELATED APPLICATION

Reference is hereby made to my copending application Ser. No. 626,732, filed on even date herewith for Apparatus For Simultaneously Electrochemically Machining a Plurality of Previously Formed Surfaces of a Workpiece.

BACKGROUND OF THE INVENTION

The machining of accurately dimensioned openings in an electrically conductive part, as for example, the wrist pin and crankshaft holes in a connecting rod, if done by conventional machining operations usually requires several different sequential steps including boring, deburring and honing. These operations are performed by different pieces of equipment, and the final hole must be extremely accurate. Accuracy is expressed in terms of the diameter of the hole, such as a diameter of within 0.0005 inch accuracy, and also in terms of "out of round." For example, in one typical specification the out of roundness may be expressed as not being more than 0.0003 inch, or in other words, the difference in the diameter taken at two separate locations.

Electrochemical machining offers the advantage of speed because it is not affected by the hardness of the material being machined. This type of machining, however, because of such variables as current density, voltage, electrolyte temperature, and to some extent electrode design, presents problems in machining holes to the accuracy required in accordance with present industry standards. It offers the advantage, however, of eliminating plural operations such as deburring and honing since the electrochemical machining process is capable of providing smoothly finished parts having a relatively good microinch finish and being free of burrs and the like. It also offers the advantage of high tool feed rates. Furthermore, an electrochemical machining tool is not subject to mechanical deflection forces and therefore is not restricted to follow the alignment of the previously formed opening and thus can, in one operation, accurately position that opening with respect to a datum.

One of the difficulties, however, is maintaining close tolerances in the machining operation due to variations in the "over-cut" between the electrochemical machining tool and the finished opening which is a function of the conditions existing in the work gap. For example, changes in voltage, current density, electrolyte flow characteristics and its temperature may bring about non-uniform overcutting which forms a basis for rejecting the part because its measurement is beyond allowable tolerances. While the variables previously described are controlled to a fairly high degree of accuracy, it is somewhat difficult to control all of these variables to very narrow tolerances in order to control the amount of overcut and thus the final dimensions of the finished surfaces in each part.

SUMMARY OF THE INVENTION

This invention relates to an electrode for use as an electrochemical machining tool and more particularly to a tool for finishing a previously formed opening in an electrically conductive workpiece to a precise dimension.

The electrochemical machining tool constructed in accordance with the present invention includes a large area of working surface to enlarge a previously formed hole in a workpiece and also includes a finishing machining area for precisely dimensioning the finished opening. Such a tool is especially useful for enlarging previously formed holes, for example, wrist pin and crankshaft holes in a connecting rod for an internal combustion engine, and for finishing the workpiece to the required tolerance in one operation.

While it is well known in the prior art to provide a tapered surface to increase the working surface of the electrode or tool, and thus to increase the penetration rate of the tool into the workpiece, it is novel to provide a finishing surface having precisely controlled axial and circumferential dimensions immediately adjacent the tapered surface for close accurate control of the amount of overcut. In one embodiment of the invention, the tool is circular in cross section and has a conically shaped first machining surface to enlarge a previously formed opening and a cylindrically shaped second machining surface to finish to the desired dimension and shape.

By using the combination of a tapered machining surface to provide rapid removal of material and a finishing maching surface substantially parallel to the direction of tool movement to control the final shape and dimension, it is possible to create a circular opening in a workpiece without rotating the tool with respect to the workpiece. The angle of the tapered surface with respect to the direction of tool travel into the workpiece is determined, among other factors, principally by the voltage applied across the tool and the workpiece and its feed rate.

The axial dimension of the second or finishing machining surface is made as small as practically possible, and in order to provide constant amounts of overcut from one machining operation to the next, the dimensions of this finishing surface are closely controlled. The second machining surface is included to facilitate accurate shaping of the finished opening by insuring that the tool has the proper cross sectional dimensions. In the preferred embodiment, the tool is formed from brass or other similar electrically conducting materials, and the finishing machining surface is accurately ground to the required dimension. With presently available machining techniques, it is possible to provide a finishing machining surface having an axial dimension of 0.003 inch with an accuracy of ±0.0005 inch, thus producing overcuts with respect to the second machining surface of approximately 0.006 inch which are relatively small for the electrochemical machining process and which thereby minimize the total variation in overcuts between parts due to any uncontrolled variations in machining parameters.

In another embodiment of a tool constructed in accordance with this invention, a preformed gear, for example, may be finished to precise dimensions by a tool having a tapered machining surface for shaping the gear blank to the approximate final dimension and a second machining surface controlling the final gear configuration. Thus, external as well as internal surfaces may be machined to the final finish dimensions, with the tools described herein.

Immediately adjacent the finishing machining surface and extending to the rear of the tool is an insulating surface functioning to prevent further electrochemical machining of the workpiece and to provide a smooth outer surface flush with the machining surface thereby promoting smooth and nonturbulent flow of electrolyte across the machining surfaces and between the tool and the workpiece. Since the temperature of the tool normally increases as it moves into the workpiece during machining, it is essential that the insulating material have the same total thermal expansion as the tool throughout the operating range of temperatures. A difference in thermal expansion in these parts may create a discontinuity immediately adjacent the finishing machining surface and disturb the smooth and uniform flow of electrolyte and thus develop inaccuracies, e.g., grooves or striations in the part being machined.

Accordingly, it is an object of this invention to provide an electrochemical machining tool for expanding previously formed openings in an electrically conducting workpiece to a precisely controlled dimension and high surface finishes in a single machining operation; and to provide an electrochemical machining tool having in combination a tapered machining surface providing a relatively large machining area for rapid penetration of the tool into the workpiece, a finishing machining surface adjacent the tapered machining surface accurately defining the shape of the finished opening and having the axial dimension carefully controlled to provide an accurate and constant overcut throughout the circumferential extent of the tool, and an insulating surface extending from the finishing machining surface to the rear of the tool preventing further electrochemical machining while at the same time providing a continuous surface for the smooth and uniform flow of electrolyte over the machining surfaces and between the tool and the workpiece.

Other objects and advantages of the invention will be apparent from the following description, the accompanying drawings and the appended claims.

BRIEF DESCRIPTION OF THE DRAWINGS

FIG. 1 is a view partly in section and partly in elevation showing a workpiece, a workpiece fixture, an electrolyte manifold and the electrochemical machining tool of this invention extending partially into a preformed opening in the workpiece;

FIG. 2 is an enlarged elevational view of the electrochemical machining tool of this invention with a portion thereof shown in cross section;

FIG. 3 is a cross sectional view of the electrochemical machining tool and tool holder;

FIG. 4 is an end view of the tool shown in FIGS. 1 through 3;

FIG. 5 is an elevational cross sectional view of another embodiment of the electrochemical machining tool constructed according to this invention especially adapted for finishing preformed gears; and FIG. 6 is a view of the bottom of the tool for finishing gears shown in FIG. 5.

DESCRIPTION OF THE PREFERRED EMBODIMENT

Reference is now made to FIGS. 1 through 4 showing one embodiment of the electrochemical machining tool or electrode 10. The tool 10 is circular in cross section and is mounted on a tool support 11 for linear movement into a workpiece 13, and is shown in FIG. 1 extending partially through an opening 12 in the electrically conductive workpiece 13, such as a wrist pin hole in an automobile connecting rod previously formed to approximately the finished dimensions. The workpiece is supported by an electrically conductive fixture 15 having an opening 16 therein axially aligned with the tool 10 to receive the tool after it has passed completely through the workpiece 13. Insulation 17 protects the fixture from the electrochemical machining action. A direct current voltage of approximately 22 volts is applied between the tool 10 and the workpiece with the tool having a negative polarity with respect to the workpiece.

An electrolyte solution is supplied between the tool 10 and the workpiece 13 to provide a path for the electrical current and at a sufficient velocity to supply the necessary vehicle to dispose of the anodic products of the machining operation. This electrolyte solution, prepared by mixing four pounds of sodium nitrate and ¾ pound of sodium chloride per gallon of water, is recirculated by means not shown after passing through the working area to cool the electrolyte to the desired operating temperature and to filter out these anodic products before the electrolyte is resupplied between the tool and workpiece.

An adequate quantity of electrolyte is supplied by a pump, not shown, to a manifold 20 having a lower surface 21 which sealingly engages the upper surface of the workpiece 13. A seal 22 is secured in the manifold 20 and surrounds the tool support 11. This seal is conventional and includes an annular rubber lip 23 extending downwardly and in engagement with support 11 and held in place by a plurality of metal fingers 24. The pressure of the electrolyte, typically in the order of 300 p.s.i., will aid in holding the rubber lip 23 against the tool support 11, while allowing the tool to move downwardly at a uniform rate. Electrolyte is supplied through openings 25 in the manifold 20 to an interior chamber 26 and flows against an annular shoulder which forms a dam over which the electrolyte flows. From the shoulder 27 the electrolyte flows downwardly around the tool support 11 and between the tool 10 and the workpiece 13 into the opening 16 in fixture 15 where suitable means, not shown, is provided to remove the electrolyte and to recirculate it. Other types of electrolyte manifolds may be used provided they permit an adequate supply of electrolyte to flow smoothly and uniformly around the tool 10 and between the tool and the workpiece to provide an electrically conductive medium.

The electrode is shown in detail in FIG. 2 and is machined from a brass cylinder or other easily machined and electrically conductive material. The electrode 10 includes a forward face 30 substantially perpendicular to the long axis of the electrode. Adjacent the forward surface 30 is a conically shaped or tapered electrochemical machining surface 31 whose taper is determined by the angle $a$ between the outer normal surface of the tool and the surface 31. In the embodiment shown, the angle $a$ is approximately 10°. The angle $a$ of the tapered surface 31 is determined primarily by the voltage applied to the tool, and by the feed rate of the tool into the workpiece, and may vary between about 0° and 90°. For example, increasing the angle $a$ from 5° to 15° requires either an increase in voltage across the tool or a decrease in the feed rate of the tool into the workpiece. Stated another way, the angle $a$ is a cosecant function of the feed rate.

In designing a tool, the angle $a$ is selected within the range specified as a function of voltage and feed rate, the latter being determined primarily by the rate at which the machining operation is to be carried out. After the angle of the tapered surface 31 is selected, the axial length $L$ of the tool is determined so that the diameter of the forward face 30 is sufficiently small to permit insertion into a preformed opening in a workpiece.

As is apparent, the length $L$ of tools having a surface tapered between about 5° and 15° may vary, but in each case, the leading portion 32 of the tool is proportioned to be received into the preformed opening 12 so that the tool initially penetrates partially into the opening without contacting the workpiece. The trailing portion 33 of the surface 31 is proportioned in diameter to the desired finished dimension of the machined opening in the workpiece. Thus, it is apparent that the more material to be removed from the preformed opening of the workpiece, the longer must be the tapered surface 31 in order for the leading face 30 to penetrate initially into the preformed opening.

The tapered electrochemical machining surface 31 therefore provides a tapered electrochemical machining surface functioning to provide a large surface area enabling the rapid removal of workpiece material and thus allows relatively large feed rates of the tool into and through the workpiece.

A finishing electrochemical machining surface 35 is located immediately adjacent and integral with the tapered machining surface 31 and functions to finish the opening 12 to a precise dimension while removing only a minimum amount of additional workpiece material. In the embodiment shown in FIG. 1, the finishing machining surface 35 is cylindrical and its outer surface is parallel with the axis of the tool as well as the direction of advancement of the tool into the workpiece. The axial dimension A of the finishing machining surface 35 is made as small as practically possible, i.e., in the order of 0.003 to 0.005 inch with this dimension being maintained to an accuracy of ±0.0005 inch. Thus, the axial dimension of the surface 35 at any position along the circumference does not differ from the axial dimension of any other position along the circumference by more than 0.001 inch. The finishing surface 35 is shown in these drawings exaggerated in size for the purpose of clarity in describing the invention, however, on an actual tool, the finishing surface 35 is practically invisible to the unaided eye.

The tool includes an axially extending shank 37 of a diameter less than the diameter of the finishing surface 35 and located immediately adjacent to it. The shank is formed by a machining operation which results in an annular flat surface 38, which with trailing portion 33 of the tapered surface 31 defines the axial dimension of the finishing surface 35. The annular flat surface 38 is machined perpendicular to the axis of the tool and the finishing surface 35. The axis of the annular surface 38 is coaxial with the axis of the tool to provide the most uniform dimension for surface 35. The diameter of the shank 37 is about 0.220 inch smaller than the diameter of the finishing surface 35 so that the radial dimension of surface 38 is about 0.110 inch.

An insulating sleeve 40 of epoxy type material (reaction product of epichlorohydrin and bisphenol A) surrounds the shank 37 and is in contact with the annular flat surface 38. The material used as a insulator possesses essentially the same coefficient of thermal expansion as the material used for the tool. Additionally, the insulating material is non-porous, resistant to absorption of moisture for preventing passage of current through the insulating material to the workpiece, and relatively chemically inert with respect to the electrolyte which flows in the space between the tool and the workpiece. Typical insulating materials include a casting resin type RP–3260 available from Renn Plastics, Inc., of Lansing, Mich. or Stycast casting resin type 2651 MM, available from Emerson and Cuming of Canton, Mass.

In making the tool, the initial tool dimensions are somewhat larger than the final tool dimensions, and the shank 37 is machined thereby forming flat surface 38. Thereafter, the insulating sleeve 40 is formed by casting the resin around the shank so that it is in abutting relationship with the surface 38. The outer surface of the tool is ground to provide the desired diameter, and the grinding operation removes not only a portion of the metal which ultimately forms the finishing machining surface 35, but also removes the portion of the sleeve 40 axially above surface 35. Thereafter, the tapered surface 31 is ground to the desired angle, and in the grinding operation the trailing portion 33, which determines the axial length of the finishing surface 35, is formed within the ranges previously described.

The insulating sleeve 40 includes a relatively short cylindrical section 42 axially above the surface 35 whose outer surface is coextensive with the finishing machining surface 35. The axial dimension of surface 42 is about 0.050 inch and is machined at the same time the finishing surface is machined. The remaining portion of the insulation 40 is tapered at a shallow angle b, typically in the order of 1°, to provide a relief permitting the smooth and uniform flow of electrolyte over the machining surface of the tool.

By providing an insulating material which has essentially the same coefficient of thermal expansion as the material used for the tool, exterior surface of the insulating sleeve axially of the finishing machining surface 35 remains flush to eliminate any projection which would result in non-uniform electrolyte flow. Since there may be a slight difference in the coefficient of thermal expansion of the sleeve and the metal of the tool, the total thickness of the insulating sleeve 40 is maintained relatively thin in order to reduce the total difference in expansion.

The rear face 44 of the tool 10, including both the electrically conductive brass portion and the insulation, is machined perpendicular to the axis of the tool. A lip 45 is provided to assist in the alignment of the tool in the tool holder. The tool is provided with a hole 46 extending coaxially with and entirely through the tool with a countersunk portion 47 at the forward part for accommodating the head of the flat head screw. With this construction, easy assembly with and good electrical contact between the electrically conductive metallic portion of the tool and the tool support 11 is maintained.

Referring now to FIG. 3, the lip 45 on the tool 10 is shown received into a recessed portion 49 in the tool support 11 for axial alignment with the support 11. A screw 50 extends through the opening 46 in the tool and is received into the internally threaded opening 52 in the tool support 11 to maintain the tool rigidly in place and, in addition, to increase the electrical contact between the tool 10 and the tool support 11.

The tool support 11 is constructed from an electrical conductor, such as brass, and has its front end 53 machined perpendicular to its axis to provide intimate contact with the surface 44 of the tool 10 and thus permit high electrical currents to pass through the tool. A further path for the electrical current is through the head of the screw 50 which electrically contacts the tool through the countersunk hole 47, and the body of the screw which is received in the hole 46 and electrically contacting the tool body.

Surrounding the tool support 11 is a coating of insulation 55 having an outside diameter the same as the diameter of the insulation at the rear of tool 10. This construction therefore provides a smooth interface between the tool and the workpiece and does not form a boundary causing turbulence in the electrolyte flow around the tool.

The tool support 11 is secured in axial alignment to a drive means 60 by a stud 61, the tool support being provided by a lip 62 on the support 11 which is received into a recess 63 in the drive means. A source of negative potential is therefore applied through the drive means and the tool support to the tool 10. The drive means is conventional and moves the tool relative to the workpiece at a predetermined feed rate which, with the tool shown, is in the order of two inches per minute.

Extraneous machining currents between the insulated portion of the tool 10 and tool support 11 and the workpiece 13 are prevented by maintaining the insulation 40 on the tool and insulation 55 on the tool support 11 square with the ends of their respective parts.

When the tool is then placed in position on support 11, electrical contact is made and the end surface of the insulation 40 and 55 also abut and prevent electrolyte from entering between these parts to create a path for additional electrochemical machining current. A return passage for the electrolyte may be provided through the tool and tool support under some conditions.

The electrochemical machining operation accomplished by the tool of the present invention may be understood with reference to FIG. 1 which shows the tool 10 partially extending through an opening 12 previously formed in the workpiece 13. The leading portion 32 of the tool extends into the opening 12 without contact therewith while the tapered surface 31 functions to enlarge the opening to approximately the size and shape of the desired finished opening. The tool is moved at a constant rate into the opening 12 in the direction shown by the arrow with the tapered machining surface providing a relatively large effective working area permitting the rapid penetration of the tool into the workpiece. The finishing machining surface 35 machines the opening 12 to the finished shape and size, and since it has a precisely maintained axial dimension extending circumferentially therearound, the amount of over cut provided by the finishing machined surface will be constant throughout the circumference of the tool. Operating the tool under the conditions set forth in the above description will produce an overcut of approximately 0.006 inch on each side of the tool for a total overcut of 0.012 inch. The insulation 40, whose axial length is greater than the thickness of the part being machined prevents further machining of the workpiece and thus maintains the dimension of the finished opening.

The electrolyte is directed uniformly over the surfaces of the tool 10 and between the tool and the workpiece so that uniform machining throughout the entire circumference of the tool is possible. In the preferred embodiment fresh electrolyte moves first over the machining surface 35 which does the final precision machining and finishing operation and then over the tapered machining surface 31. This prevents sludge or other deposits from forming on the finishing machining surface which might cause flow lines or other irregularities in the finished opening and insures that the most uniformly controlled conditions of electrolyte exist at the finishing machining surface. It is understood, however, that the electrolyte may flow between the tool and the workpiece in either direction as long as uniform electrolyte conditions over the finishing machining surface are maintained.

To prevent stray electrical currents and to protect the fixture 15 from electrochemical machining action, the forward surface 30 of the tool may be coated with insulation, although such additional insulation is not required for the proper operation of the tool.

While it is contemplated that circular openings having a high degree of accuracy may be created in a workpiece without rotating the tool, it is understood that an electrochemical machining tool of circular cross section similar to that described above may also be mounted for rotation on a precision spindle incorporating roller or ball bearings with the tool being rotated as it is advanced into the workpiece. Using this method of machining, accuracy of the finished surface within twenty-five millionth inch (0.000025) to fifty millionth inch (0.000050) is possible.

While a tool of circular cross section has been described with reference to FIGS. 1 through 4, it is understood that other configurations of the electrochemical machining tools employing the principles of this invention may be constructed, for example, as shown in FIGS. 5 and 6. Here an electrochemical machining tool is designed to finish preformed gear blanks. A tool 70 is formed from brass or other similarly electrically conducting material and includes a number of inwardly extending ribs 71. The entire circumferential extent of the tool includes a tapered electrochemical enlarging surface 72 for shaping the gear to the approximate finished dimension and a finishing surface 74, also extending throughout the entire circumferential extent of the tool, immediately adjacent the tapered electrochemical enlarging surface 72 for finishing the workpiece 73 to its precise dimension. The tapered surface 72 is shown in FIG. 5 at an angle of 45° with respect to the axis of the tool, but it is to be understood that other angles, such as 5°, could be used.

In this embodiment, as well as in the embodiment shown in FIGS. 1 through 4, the finishing electrochemical surface 74 is parallel to the direction of tool travel with respect to the workpiece and is carefully controlled as to its axial dimensions so that the total variation in its dimensions throughout its circumferential extent is no more than ±0.0005 inch. Insulation 75 extends into the cutaway portion of the tool 70 to prevent further electrochemical machining of the workpiece 73 and has the same dimensions on its exterior surface as the finishing machining surface 74. Thus, relative movement between the tool 70 and the workpiece 73 with the electrolyte flowing first across the electrochemical machining surface 74 will produce a finished gear from a preformed gear blank in a single operation. For shaping internal gears, the cross sectional configuration of the tool shown in FIG. 1 would be modified to provide outwardly extending ribs having the first and second machining surfaces, as previously described.

While the form of apparatus herein described constitutes a preferred embodiment of the invention, it is to be understood that the invention is not limited to this precise form of apparatus, and that changes may be made therein without departing from the scope of the invention.

What is claimed is:
1. An electrochemical machining tool for finishing to precise dimensions a previously formed surface on an electrically conductive workpiece, said tool comprising
   an electrically conductive body having a longitudinal axis defining the direction of said tool travel relative to the workpiece, said body including a flat surface, a tapered machining surface, and a finishing machining surface,
   said flat surface being formed on said body and extending for a substantial distance from said finishing machining surface perpendicular to said longitudinal axis,
   said tapered machining surface formed on a forward portion of said body, and being inclined to said longitudinal axis at an angle of from 5° to 45°, and dimensioned at the forward portion of said body to be received into the previously formed surface of the workpiece,
   said finishing machining surface formed on said body, oriented parallel to said longitudinal axis and located between said flat surface and said tapered machining surface, said flat surface and said tapered machining surface defining the dimension of said finishing machining surface in the longitudinal direction,
   and insulating means abutting and flush with said finishing machining surface for facilitating the smooth and uniform flow of electrolyte over both said machining surfaces and between the tool and the workpiece, said insulating means extending rearwardly from said flat surface to prevent electrical current from passing therethrough and thus to prevent further electrochemical machining of the workpiece by said conductive body.
2. The tool defined in claim 1 wherein the axial dimension of said finishing electrochemical machining surface is small with respect to said tapered electrochemical machining surface and wherein the finishing machining surface has a precisely controlled dimension in the direction of tool advancement to facilitate accurate dimensioning of the finished opening.

3. The tool defined in claim 1 further including a shank integrally formed with said finishing machining surface and said tapered machining surface;

said shank portion having a diameter less than the diameter of the finished machining surface and forming therewith a surface coaxial with and perpendicular to the axis of the tool to define precisely the electrochemical machining surface; and wherein said insulating means surrounds said shank portion, fills the space between said shank portion and has the diameter of the finishing machining surface.

4. The tool defined in claim 1 wherein said insulating means is formed from an electrically insulating material substantially impervious to moisture and which has approximately the same total thermal expansion as the tool material to insure a smooth surface interface between the insulating means and the finishing machining surface regardless of temperature variations in the operating range of the tool thus providing for smooth and uniform flow of electrolyte across the machining surfaces of said tool.

5. The tool defined in claim 1 wherein the angle between the tapered machining surface and the direction of tool advancement into the workpiece and the dimension of the finishing machining surface in the direction of tool advancement are functions of the feed rate and voltage.

6. The tool defined in claim 1 wherein the leading surface of the tool is coated with an insulating material to eliminate current from passing into the tool support and thus assist in preserving the dimension of associated workpiece holders.

7. The tool defined in claim 1 wherein the rear surface of the tool is provided with a relatively large surface area for connection with a workpiece holder to provide good electrical contact therewith.

8. A tool as defined in claim 1 wherein said finishing machining surface has a dimension in the longitudinal direction of 0.003±0.0005 inch.

9. An apparatus for producing precisely dimensioned finished surfaces on an electrically conductive workpiece having a previously formed surface of a dimension different from the dimension of the finished surface, said apparatus comprising, an electrochemical machining tool;

means providing for relative movement between the said tool and said workpiece to advance the tool into the workpiece at a predetermined rate;

means supplying a smooth, uniform and adequate flow of electrolyte between said tool and said workpiece to provide an electrically conductive medium therebetween; and means for supplying an electrical current between said tool and said workpiece of such a potential that said tool is negative with respect to said workpiece to cause electrochemical machining of the workpiece and to finish the surface thereof to a precisely controlled dimension and shape;

said tool comprising an electrically conductive body having a longitudinal axis defining the direction of said tool travel relative to the workpiece, said body including a flat surface, a tapered machining surface, and a finishing machining surface;

said flat surface being formed on said body and extending for a substantial distance from said finishing machining surface perpendicular to said longitudinal axis, said tapered machining surface formed on a forward portion of said body, and being inclined to said longitudinal axis at an angle of from 5° to 45°, and dimensioned at the forward portion of said body to be received into the previously formed surface of the workpiece, said finishing machining surface formed on said body, oriented parallel to said longitudinal axis and located between said flat surface and said tapered machining surface, said flat surface and said tapered machining surface defining the dimension of said finishing machining surface in the longitudinal direction, and insulating means abutting and flush with said finishing machining surface for facilitating the smooth and uniform flow of electrolyte over both said machining surfaces and between the tool and the workpiece, said insulating means extending rearwardly from said flat surface to prevent electrical current from passing therethrough and thus to prevent further electrochemical machining of the workpiece by said conductive body.

References Cited

UNITED STATES PATENTS

| | | | |
|---|---|---|---|
| 3,285,844 | 11/1966 | Hallsworth et al. | 204—224X |
| 3,257,300 | 6/1966 | Williams | 204—143 |
| 3,306,838 | 2/1967 | Johnson | 204—284X |
| 3,409,535 | 11/1968 | Ross et al. | 204—255X |
| 3,410,781 | 11/1968 | Carlson et al. | 204—224 |
| 3,410,980 | 11/1968 | Gugger et al. | 204—143X |

JOHN H. MACK, Primary Examiner

D. R. VALENTINE, Assistant Examiner

U.S. Cl. X.R.

204—290